(12) United States Patent
Tobin et al.

(10) Patent No.: US 8,204,245 B2
(45) Date of Patent: Jun. 19, 2012

(54) BUMPER WITH SPEAKER

(75) Inventors: Michael W. Tobin, St. Charles, MO (US); Paul A. Lundberg, South Barrington, IL (US)

(73) Assignee: Lund Industries, Inc., Wheeling, IL (US)

( * ) Notice: Subject to any disclaimer, the term of this patent is extended or adjusted under 35 U.S.C. 154(b) by 841 days.

(21) Appl. No.: 12/263,188

(22) Filed: Oct. 31, 2008

(65) Prior Publication Data

US 2009/0110224 A1 Apr. 30, 2009

Related U.S. Application Data

(60) Provisional application No. 60/983,969, filed on Oct. 31, 2007.

(51) Int. Cl.
*H04R 1/02* (2006.01)

(52) U.S. Cl. .......... 381/86; 381/340; 381/341; 381/386; 381/389; 293/142

(58) Field of Classification Search .................. 381/386, 381/340, 86, 341, 389; 293/142
See application file for complete search history.

(56) References Cited

U.S. PATENT DOCUMENTS

| | | | | |
|---|---|---|---|---|
| 4,412,593 A | * | 11/1983 | Taira | 180/68.6 |
| 5,970,158 A | * | 10/1999 | Beltran | 381/341 |
| 6,113,164 A | * | 9/2000 | Setina | 293/142 |
| 6,516,076 B1 | * | 2/2003 | Marlin | 381/340 |
| 2002/0100626 A1 | * | 8/2002 | Kang et al. | 180/68.4 |
| 2002/0113446 A1 | | 8/2002 | Rinklin | |
| 2004/0135385 A1 | * | 7/2004 | Murray et al. | 293/142 |
| 2006/0215870 A1 | | 9/2006 | Guenther | |

OTHER PUBLICATIONS

CPI, Cast Products, Inc., About Us, http://www.getcpi.com/about/, Nov. 3, 2008, 2 pages.
International Searching Authority (ISA), U.S. Receiving Office (US), International Search Report for PCT/US09/62821 mailed Oct. 30, 2009.

* cited by examiner

*Primary Examiner* — Michael Trinh
(74) *Attorney, Agent, or Firm* — Beem Patent Law Firm

(57) ABSTRACT

A sound projecting bumper may include a vehicle bumper configured to be attached to a vehicle, the bumper comprising a plurality of uprights and at least one generally horizontal member, the bumper further comprising a horn for emitting sound, the horn comprising a driver, a cone, a speaker and a diaphragm for producing the sound, and wiring to connect the bumper device to the vehicle's electrical system. The horn may be configured to focus sound particularly forward of the vehicle. The driver may be attached to one of the uprights, and the bumper may include a second driver attached to a second one of the uprights. The horn may be generally aligned with one of the uprights, or the horn may be formed in a generally horizontal member. The bumper may further include a channel in the generally horizontal member, wherein the channel extends generally along a portion of the generally horizontal member, turning to form the horn.

13 Claims, 4 Drawing Sheets

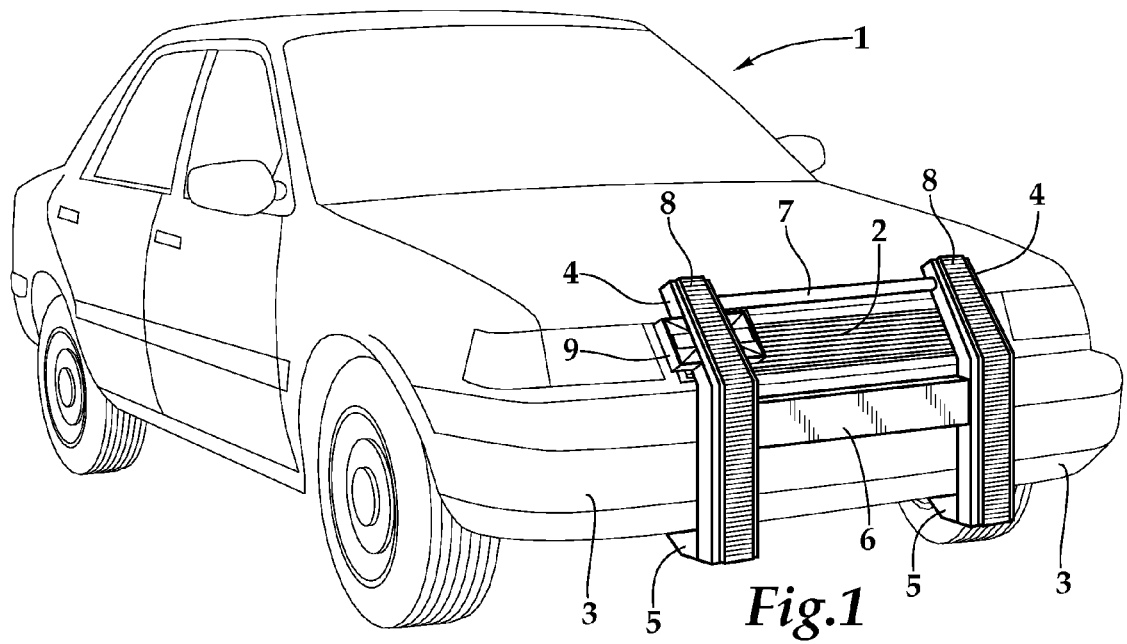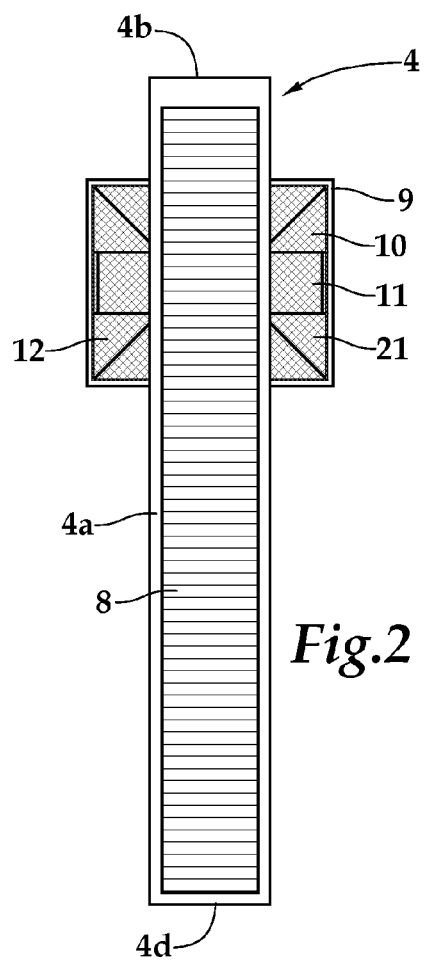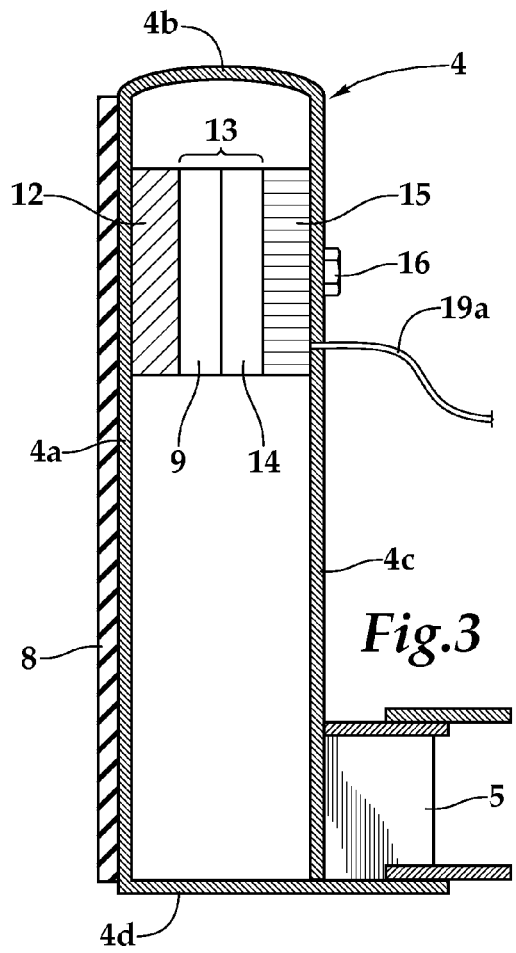

BUMPER WITH SPEAKER

This application claims priority to U.S. Provisional application 60/983,969, filed Oct. 31, 2007.

BACKGROUND OF THE INVENTION

This bumper with speaker for siren relates to law enforcement equipment and more specifically to a push bumper upright including a sized and oriented speaker combined with the upright for projecting a siren sound to a vehicle ahead of a law enforcement vehicle.

Vehicles of law enforcement, particularly police cars, take officers to the vicinity of violators of laws. Generally, 60,000 police cars along with 15,000 police push bumpers are sold annually within the U.S. Police cars indicate the presence of an officer to a violator or to request the right of way from the vehicles of the motoring public, using visual and auditory means. The visual means, generally flashing or blinking lights, attracts the attention of a vehicle driver and also warns surrounding vehicles. The auditory means, generally a siren, a wail, or a yelp, of high pitch and volume, grabs the attention of a driver who is suspected of violating a law or to request the right of way.

The siren cuts through vehicle and road noise surrounding the driver and noise from radios, passengers, and cellular telephones enveloping the driver. The visual means are generally installed upon the roof of a law enforcement vehicle with some models of lights also installing within the front grill, front windshield or rear windshield of a vehicle. The auditory means, sirens, are installed in front grills and in the vicinity of front bumpers on law enforcement vehicles.

With the incentive for greater fuel efficiency in passenger cars and light trucks, new vehicles have tighter door and window seals for lesser aerodynamic resistance during driving. The tighter seals lead to a quieter ride for the passengers which increases the difficulty of exterior sounds entering the cabin. Occupants and drivers of newer vehicles have a more difficult time hearing the siren of a police car or other emergency vehicle.

Sounds are generated by speakers, generally electrically powered. Various manufacturers make drivers that move the diaphragm of a speaker, including sirens. The driver generally activates an electromagnet rapidly that moves the diaphragm inwardly and outwardly within a speaker housing to create sound of a certain frequency and volume. During periods of long and high usage of a siren, the speaker moves rapidly and outputs many watts of sound. The work in creating that sound heats the driver. A warm driver can transfer that heat to a diaphragm and alter the sound quality adversely.

DESCRIPTION OF THE PRIOR ART

Over the years, various auto manufacturers working with top law enforcement agencies have developed positions for siren speakers in the front of police and other vehicles. Most police cars use a single siren speaker located in the front of a vehicle to project sound to a violator of a law ahead of the police car. Prior versions of sirens have been installed in the front grills near the hoods of vehicles and in lightbars mounted on the roof of emergency vehicles. However, recent passenger car designs have angled, nearly flattened, and almost eliminated front grills. The auto manufacturers have restricted the placement of devices within the air flow towards the radiator of a vehicle. As the grills admitted air to an engine, the grills transmitted the sound of a siren forward. With grills reduced in size as required air flows decreased, sirens did not function well in the smaller grills, had no room to function, or encountered manufacturer's prohibition of devices within the grill.

Vehicle manufacturers and siren installers migrated the siren to the bumper fascia and behind vehicle grills. Present day passenger cars and light trucks have a front bumper generally blended into the aerodynamic shape of the car. The bumper extends forward of the car to serve its bump resistant purpose. However, the bumper is concealed into an aerodynamic shape with fascia extending from the bumper downwardly to the front quarter panels alongside the engine. The fascia provides a location for mounting a siren. However, siren mounts upon fascia are closer to the ground and upon a material, generally plastic, that vibrates. During car usage, fascia encounters mud, stones, and snow that from time to time deflect the fascia and devices attached thereto. Additionally, placement of siren speakers behind or within bumper fascia reduces the performance and sound output from the speaker.

Presently, police cars have a push bumper attached to the front center of the car. The push bumper allows a police car to push a disabled vehicle from a roadway and in rare opportunity to serve as a ram. Many manufacturers provide push bumpers and their uprights such as Setina Manufacturing Co.

On ambulances, fire trucks and apparatus, and select law enforcement vehicles, air horns are also located in the vicinity of the bumper. The air horns, especially for ambulances, are louder and lower in pitch than the sirens of police cars. The air horn function in most police sirens overrides the other emergency tones from the police sirens. However, for proper warning to a violator of a law, the police car must display both visual and auditory warnings. While air horns do not mask flashing lights, the air horns swamp the police siren sound making for improper warnings to violators. Additionally, air horns on surrounding vehicles, such as trucks or equipment, may mask the sound of a police siren. A police car without proper auditory warning to violators of the law may itself violate State statutes and may provide the violators a defense in court of improper warning. Further, a siren not heard by other vehicles, as masked by an air horn, may cause a collision between a police car, in high speed pursuit, with a nearby vehicle. Sirens, such as the present invention, have to reduce the liability towards a law enforcement agency.

The patent to Setina, U.S. Pat. No. 6,113,164, shows an auxiliary push bumper for a vehicle. The push bumper mounts to the two rails of a car chassis outwardly of the OEM bumper. The push bumper has two brackets connecting in line with the rails and bumper sections extending outwardly from the brackets and curving back towards the vehicle. Though this patent describes a bumper, it does not provide a speaker or other sound generating capability.

Then the patent to Beltran, U.S. Pat. No. 5,970,158, describes a horn speaker for emergency vehicles. This horn speaker has a motor circuit to the rear within a thermally conductive mouth section. The mouth section dissipates the heat created by the motor circuit during operations. However, though this patent describes a loud horn speaker, this patent does not disclose mounting the speaker within a bumper frame or upright.

The present invention overcomes the difficulties of the prior art. That is, the prior art has utilized various bumper designs, speaker designs, and air horn locations in the vicinity of the front bumper of a law enforcement vehicle. The present invention though integrates a speaker with an upright of a push bumper augmenting the sound properties of a speaker with a protected, strategic location on a front bumper. The present invention disseminates the sound of a siren forward of a law enforcement vehicle notifying a violator of the law and requesting the right of way while reducing the liability to the law enforcement agency.

SUMMARY OF THE INVENTION

An apparatus for projecting a sound generally forward of a vehicle or a sound projecting bumper comprising at least one upright having a cone joined thereto generally parallel to the longitudinal axis of said upright; a driver receiving electrical power from the vehicle and mounting to the upright; a speaker having a housing and a horn within the housing, the housing enveloping the cone, a diaphragm within the housing and behind the horn, the diaphragm operating from the driver, the diaphragm generating a sound wave propagating generally forward of the vehicle and of a minimum frequency and a minimum volume for functioning as a siren; a cover upon the speaker, generally insect proof and waterproof, having an aerodynamic shape and a locating within the aerodynamic profile of the upright; and, a means for mounting the driver to the upright. The cover may have a shape of one of round, hemispherical, or ovoid. The apparatus may further comprise an aperture upon the upright generally opposite the forcing cone, and the driver may have a mount securing through the aperture.

In another embodiment, a device for projecting a sound forward of a vehicle, comprising a vehicle bumper configured to be attached to the vehicle, the bumper comprising a plurality of uprights and at least one generally horizontal member; a driver configured to pass from an outer side of one of the uprights through an opening in the upright and into a channel in the generally horizontal member, wherein the channel extends generally along a portion of the generally horizontal member and then turns to form a horn facing generally forward of the vehicle. The device may further comprise a second driver configured to pass from an outer side of another one of the uprights through an opening in the other one of the uprights and into a second channel in the generally horizontal member. The device may further comprise at least one opening configured to receive a light, the light receiving opening on a generally forward side of the bumper, the light receiving opening between the horn and the upright.

In yet another embodiment, the horn may be generally centered along a length of the bumper.

In still another embodiment, a sound projecting bumper may include a vehicle bumper configured to be attached to a vehicle, the bumper comprising a plurality of uprights and at least one generally horizontal member, the bumper further comprising a horn for emitting sound, the horn comprising a driver, a cone, a speaker and a diaphragm for producing the sound, and wiring to connect the bumper device to the vehicle's electrical system. The horn may be configured to focus sound particularly forward of the vehicle. The driver may be attached to one of the uprights, and the bumper may include a second driver attached to a second one of the uprights. The horn may be generally aligned with said one of the uprights, or the horn may be formed in a generally horizontal member. The bumper may further include a channel in the generally horizontal member, wherein the channel extends generally along a portion of the generally horizontal member and then turns to form the horn.

Generally, the present invention is a push bumper upright with an integral speaker driven by an electric horn, which may produce a siren sound. In one embodiment, a push bumper has two uprights spaced apart and connected by cross members. Each upright may have a generally hollow cross section within a perimeter rigid band or alternatively rigid members forming the perimeter of an upright with a solid web within the members. The hollow cross section, or the web, may provide a strategic location for a speaker and its horn. The speaker may attach firmly to a part of the rigid band or a rigid member forming the upright and may generate sound aimed forward of a vehicle. The speaker may have an orientation so that generated sound travels forward of the vehicle and may be focused or directed practically in a generally horizontal plane across the front of a law enforcement vehicle. A vehicle of a law violator in front thus hears the siren sound with little excuse.

There has thus been outlined, broadly, features of the invention in order that the detailed description thereof that follows may be better understood and that the present contribution to the art may be better appreciated. The present invention may include anti-vibration mountings of the speaker to the upright, an aerodynamic speaker housing, and simultaneous operation of the siren and an air horn. Additional features of the invention will be described hereinafter and which will form the subject matter of the claims attached.

Numerous objects, features and advantages of the present invention will be readily apparent to those of ordinary skill in the art upon a reading of the following detailed description of the presently preferred, but nonetheless illustrative, embodiment of the present invention when taken in conjunction with the accompanying drawings. Before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, the phraseology and terminology employed herein are for the purpose of description and should not be regarded as limiting.

One object of the present invention may be to provide a bumper with speaker for a siren with more sound forward of a law enforcement vehicle to a violator of a law for maximal effect.

Another object may be to provide such a bumper with speaker for a siren that maximizes usage of the properties of transmitted sound.

Another object may be to provide such a bumper with speaker for a siren that readily installs within existing push bumper uprights outside of the grill and fascia of a vehicle.

Another object may be to provide such a bumper with speaker for a siren that operates an air horn and siren simultaneously while still providing an auditory warning to a violator of a law in a vehicle.

These together with other objects of the invention, along with the various features of novelty that characterize the invention, may be pointed out with particularity in the claims annexed to and forming a part of this disclosure. For a better understanding of the invention, its operating advantages and the specific objects attained by its uses, reference should be had to the accompanying drawings and descriptive matter in which there are illustrated several embodiments of the invention.

BRIEF DESCRIPTION OF THE DRAWINGS

In referring to the drawings,

FIG. 1 describes a perspective view of a law enforcement vehicle with a push bumper for supporting one embodiment of the present invention;

FIG. 2 shows a front view of an upright of a push bumper where the upright has one embodiment of the present invention installed;

FIG. 3 illustrates a side view of the embodiment of the present invention shown in FIG. 2;

DETAILED DESCRIPTION OF THE INVENTION

Figure 4:
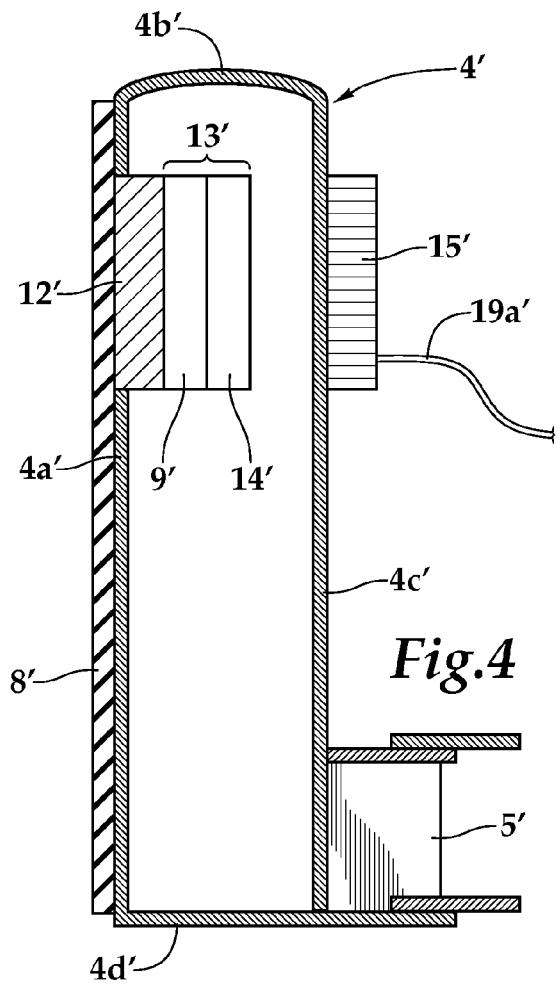
FIG. 4 shows a side view of another embodiment of the present invention similar to the embodiment shown in FIG. 2 but with the driver connecting to the rear of the upright.

The present invention overcomes one or more of the prior art limitations and provides a bumper with a speaker for a siren that directs the sound of a siren from a law enforcement vehicle forward to a vehicle of a law violator or directs the sound from a speaker on a public safety vehicle to request right of way from other vehicles. As described below the term siren may be used interchangeably with speaker or speaker/siren since the siren may generate sound and the speaker may project that sound.

In one embodiment, an apparatus for projecting a sound generally forward of a vehicle 1 or a sound projecting bumper 3a comprising at least one upright 4 having a cone 12 joined thereto generally parallel to the longitudinal axis of said upright 4; a driver 15 receiving electrical power from the vehicle 1 and mounting to the upright 4; a speaker 13 having a housing 9 and a horn 10 within the housing 9, the housing 9 enveloping the cone 12, a diaphragm 14 within the housing 9 and behind the horn 10, the diaphragm 14 operating from the driver 15, the diaphragm 14 generating a sound wave propagating generally forward of the vehicle 1 and of a minimum frequency and a minimum volume for functioning as a siren; a cover upon the speaker 21, generally insect proof and waterproof, having an aerodynamic shape and a locating within the aerodynamic profile of the upright 4; and, a means for mounting the driver 15 to the upright 4. The cover 21 may have a shape of one of round, hemispherical, or ovoid. The apparatus may further comprise an aperture upon the upright 4 generally opposite the forcing cone 12, and the driver 15 may have a mount 16 securing through the aperture.

In another embodiment, a device for projecting a sound forward of a vehicle 1, comprising a vehicle bumper 203a configured to be attached to the vehicle 1, the bumper 203a comprising a plurality of uprights 204 and at least one generally horizontal member 206; a driver 215 configured to pass from an outer side 226 of one of the uprights 204 through an opening in the upright 204 and into a channel 222 in the generally horizontal member 206, wherein the channel 222 extends generally along a portion of the said generally horizontal member 206 and then turns to form a horn 210 facing generally forward of the vehicle 1. The device may further comprise a second driver 215 configured to pass from an outer side 226 of another one of the uprights 204 through an opening in the other one of the uprights 204 and into a second channel 222 in the generally horizontal member 206. The device may further comprise at least one opening configured to receive a light 224, the light receiving opening on a generally forward side of the bumper 203a, the light receiving opening between the horn 210 and the upright 204.

In yet another embodiment, the horn 310 may be generally centered along a length of the bumper 303a.

Generally, a speaker may generate the sound of a siren and project the sound forward of a police car towards a violator of a law operating a vehicle or from a public safety vehicle to request right of way for emergency vehicles. The speaker may have a forcing cone integral with an upright of a police bumper frame and a housing joining to the upright. The speaker may operate under the action of a driver joining to the upright proximate the speaker. Upon departing the siren housing, the sound wave created by the speaker may rotate 90 degrees in phase, generally from a vertical, or upright orientation, to a horizontal or flat orientation. With a sound wave spreading horizontally from a police car or other public safety vehicle, the speaker may provide wider coverage of sound upon the vehicle of a law violator or upon a vehicle from whom the right of way is requested.

The present invention may attach a speaker to a law enforcement vehicle shown in FIG. 1. As described before, the present day law enforcement vehicles 1 are more and more aerodynamic, particularly in the front of the hood. The front of the hood has the grill 2 for admitting air into the radiator for engine cooling. Outside of the grill 2, the hood has decorative shaping and trim to blend with the adjacent headlights and bumper 3 below. Like stock cars of similar models, law enforcement vehicles have bumpers 3 suitable for the government 5 mph bumper crash criteria. However, law enforcement vehicles often gently push disabled cars from a roadway and sometimes ram other vehicles during pursuit operations. Stock bumpers and their mounts have a higher risk of failure during such operations. Law enforcement departments now often use push bumpers 3a of more rigid and durable construction than stock bumpers. The push bumpers 3a may have two spaced apart uprights 4. Each upright 4 may attach to a rail of the car frame upon a bracket 5. The uprights 4, generally a pair, may have a lower member 6 and an upper member 7 spanning between them. The lower member 6 and the upper member 7 may be mutually parallel and spaced apart vertically. The lower member 6 may have a generally flat cross section while the upper member 7 may have a rounded cross section for less aerodynamic resistance.

The present invention may join with or may include the uprights 4 as shown in FIG. 2. Each upright 4 may have a generally elongated narrow form that extends perpendicular to a bumper 3 of a law enforcement vehicle. In one embodiment, the upright 4 may be formed of flat bar bent into a hollow shape. Each upright 4 may have a front surface 4a that locates outwardly of the vehicle. A flexible pad 8 may adhere to the front surface 4a and may prevent the upright 4 from scratching another vehicle in contact with it. The pad 8 may extend for substantially the length of the upright 4. An upright 4 may have a lower end, generally locating below or to the bottom of a bumper 3, and an opposite upper end 4b, locating above a bumper 3 and generally in front of the hood. The upright 4 of the present invention may have a housing 9 attaching to the interior of the front surface 4a near the upper end. The housing 9 may extend slightly wider than the width of the front surface 4a. Inside, the housing 9 may protect a forcing cone (not shown as blocked by the upright) and a horn 10. The horn may collect sound from within the housing and direct it within a folded horn 11. The folded horn 11, here shown perpendicular to the upright 4, may amplify the sound to the minimum decibels required for law enforcement. Generally a law enforcement siren has a minimum sound volume of 118 dB when measured at ten feet from the source of the siren pursuant to Society of Automotive Engineers standard J1849, Recommended Practice for Emergency Vehicle Sirens. Additionally, California code of regulations Title XIII article 8 regulates sound output for law enforcement and other vehicles. The SAE standard continues to evolve while the California regulation remains in its form circa 1978.

As seen in FIG. 2, as the horn and folded horn may have cavities, as at 10, where air and sound join, debris, snow, and ice may collect inside the housing 9. Such collected debris and snow may suppress the sound volume and may deaden the invention. In the present invention, the housing 9 may have a cover 21 that is waterproof and insect proof but yet transmits sound. A Gore Tex® type membrane or other one way water releasing membrane can be used as the material of the cover 21. The cover 21 may extend upon the housing 9 outwardly of the upright 4 and over the horn 10 and folded horn 11 exposed to the front of the vehicle 1.

Turning the upright 4 to the side, i.e., when viewed from one side, FIG. 3 shows the present invention installed within an upright 4. The upright may have pad 8 upon the front surface 4a for engaging a car to be pushed. Opposite the front surface 4a, the upright 4 may have a rear surface 4c of similar width and elongation as the front surface 4a. Connecting the front surface 4a and the rear surface 4c, the upper end 4b may separate the two surfaces thus providing room for installation of the components of the present invention. Opposite the upper end 4b, the upright 4 may have the base 4d, or lower end. Near the base 4d upon the rear surface 4c, the upright 4 may have a bracket 5 for connection of the present invention to the frame of a vehicle 1. Returning near the upper end 4b, the space between the front 4a and rear surfaces 4c may provide sufficient room for the housing 9 and the audio components of the invention.

The audio components may include a forcing cone 12 incorporated with the front surface 4a near the upper end 4b. The forcing cone 12 may extend inwardly of the front surface 4a and may have a length parallel to the length of the front surface 4a. The forcing cone 12 may cooperate with the folded horn 11 in amplifying sound to minimum levels of sound. Behind the forcing cone 12 and inward of the housing 9, the speaker 13 may generate sound from a diaphragm 14 moved by a driver 15. The diaphragm 14 may have a generally circular shape secured upon the circumference. The diaphragm 14 may have a resilient material formed in a partially conically shaped depression with a ferrous material at the center. The ferrous material may respond to the driver 15, generally through magnetism. The driver 15 may create a rapidly varying magnetic field that moves the centered ferrous material inwardly and outwardly to generate sound. The movement of the diaphragm 14 may remain within the housing 9 and particularly the periphery of the horn 10. The horn 10 may collect the sound in the form of air vibrations proximate the diaphragm 14 and may direct the sound into the folded horn 11 where the sound may achieve higher volume as the vibrations are accumulated. The driver 15 may have a generally round shape, as in FIG. 5, or a shape similar to that of the perimeter of the diaphragm 14 if it is not round, often within a square frame comparable in shape to that of the housing 9. In FIG. 3, the driver 15 mounts generally inward of the rear surface 4c of the upright 4. In this embodiment, a threaded cylinder extends through a hole in the rear surface 4c for mechanical securement, such as a nut as at 16 or a rivet. The wiring, as at 19a, of the driver 15 may extend from the upright 4 towards the vehicle 1 for connection to the electrical system.

Where needed, the driver 15' may attach outward of the rear surface 4c' as shown in FIG. 4. As before, the forcing cone 12' within the housing 9' may be incorporated with the front surface 4a'. The housing 9' may extend inwardly within the upright 4' and may provide room for the speaker 13', horn 10', and folded horn 11' to create, collect, and amplify sound. In tight situations where the entire invention may not fit within an upright 4', an alternate embodiment has the driver 15' mounted outward of the upright 4' upon the rear surface 4c' toward the vehicle 1', as seen in FIG. 4. This mounting may provide maximum room within the upright 4' to locate the housing 9', generally of a fixed size. The driver 15', having a magnet surrounded by a cast core, emanates a magnetic field of sufficient strength to move the diaphragm 14' which generates sufficient sound to meet the minimum decibels required.

Figure 5:
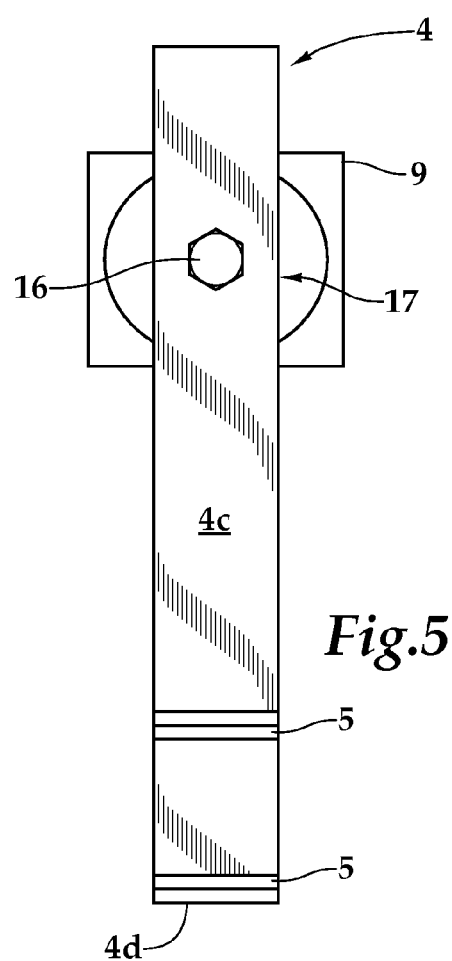
FIG. 5 provides a rear view of the embodiment of the present invention shown in FIG. 2 with the driver mounted upon the interior of the upright.

In one embodiment, the driver 15 may attach to the rear surface 4c inwardly within the upright 4 as shown from the perspective of a vehicle operator in FIG. 5. The upright 4 may have a rear surface 4c with a bracket 5 towards the base 4d. Generally opposite the mount, the rear surface may have a mount 16 shown as a threaded cylinder placed through an aperture or hole in the rear surface 4c and then secured with a nut or other mechanical means. The housing 9 may have a generally square shape, though other shapes are foreseen. Within the housing 9, the driver 15 may have magnet 17 generally exposed to release heat, created by the diaphragm 14 under the action of the ferrous material, to the atmosphere.

Figure 6A:
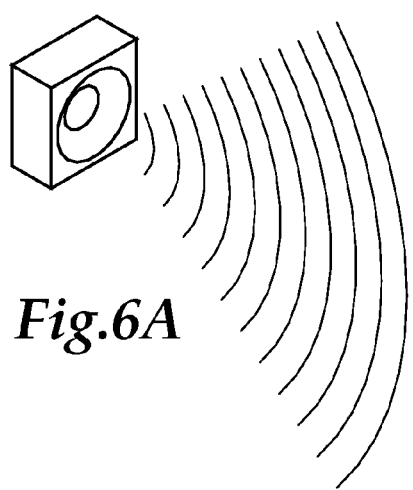
FIG. 6A illustrates typical sound wave travel and FIG. 6B shows one possibility of the travel of a sound wave generated by the present invention.
Figure 6B:
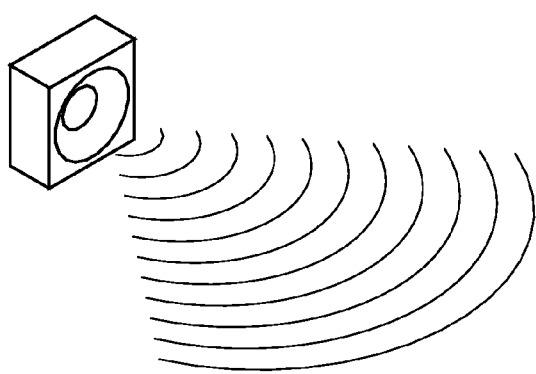

Once the present invention is installed, the driver may operate the siren to produce the siren sound associated with a law enforcement or other public safety vehicle. A speaker may generally produces a siren sound in a wave, as shown in FIG. 6a. The typical horn sound wave may have an upright, or vertical, orientation in a narrow band. This band delivers the sound wave forward to a vehicle of a law violator. Outside of the band, a law violator may not likely hear the sound of the siren. The typical sound wave may propagate primarily in a narrow forward band that may miss a vehicle of a law violator or the law violator himself. The present invention though may produce a sound wave that is more focused and directed particularly forward, perhaps having a generally flat, or horizontal orientation, as shown in FIG. 6b. This sound wave may have an amplitude measured side to side. As a law enforcement vehicle and the vehicle of a law violator may generally occupy the plane defined by a road surface, this sound wave may extend across the plane of both vehicles and ahead of the law enforcement vehicle. Escaping this sound wave calls for the law violator's vehicle to go above or below the plane of a road which is not likely. In orienting the speaker, e.g., for a horizontally aimed sound wave, the present invention may deliver more focused sound forward of a law enforcement vehicle so that the excuses and defenses of law violators and bystander vehicles noticeably decline.

Figure 7:
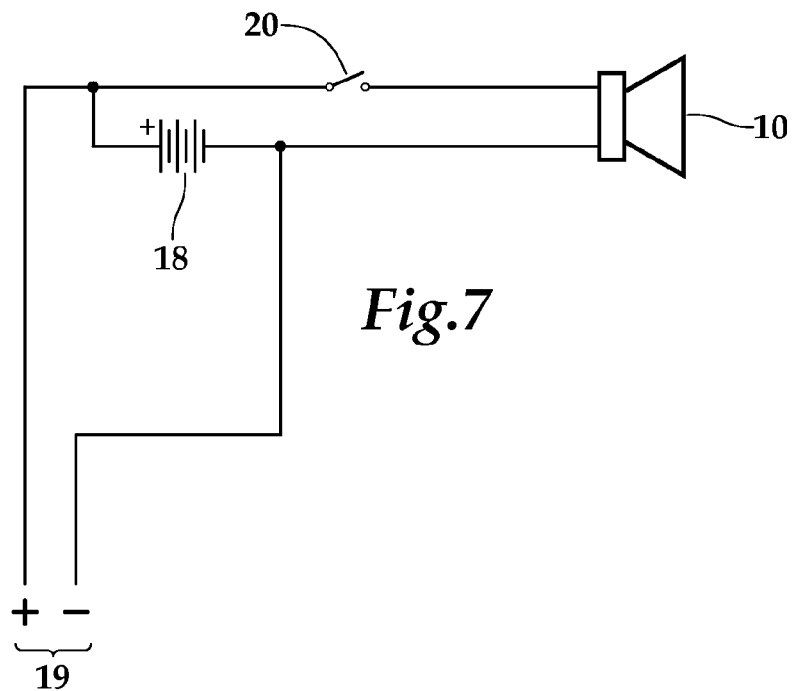
FIG. 7 shows a circuit diagram for the speaker and related components of one embodiment of the present invention; and, FIG. 8 provides a front view of an alternate embodiment of the present invention.

Preferably, the present invention may operate upon electrical power as shown in FIG. 7. The driver 15 may receive electrical power and thus make the magnet 17 and the diaphragm 14 oscillate for the speaker 11 to generate the appropriate frequency and volume of sound for a siren. The driver 15 may receive electrical power from the battery 18 of the law enforcement vehicle 1 or the electrical system 19 of the vehicle. A switch 20, generally within the cab of the law enforcement vehicle 1, may allow an officer to activate the present invention upon demand as the activities of the law violator and/or as traffic conditions warrant.

Figure 8:
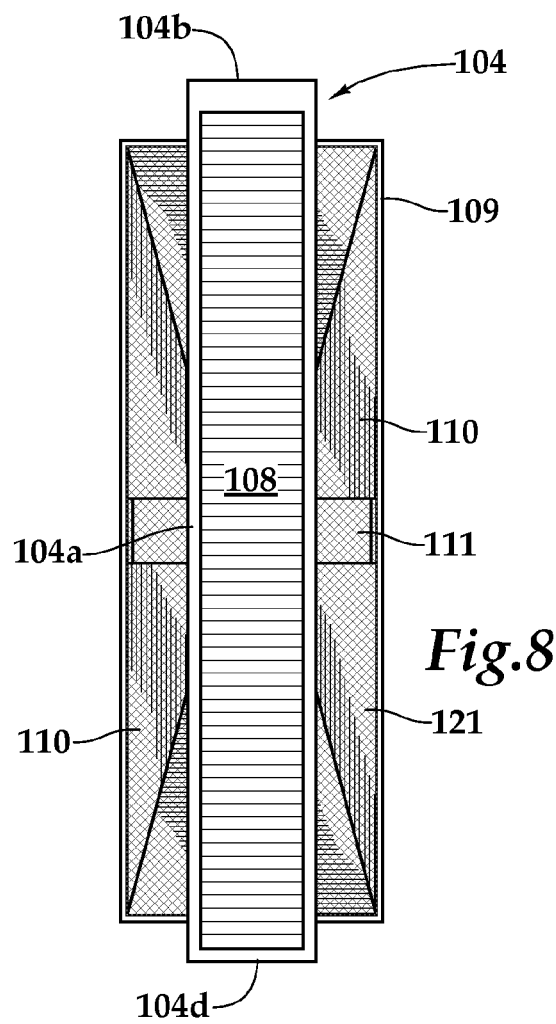

An alternate embodiment of the invention appears in FIG. 8 where the siren may extend for the length of the upright 104, above and below the bumper 103. An upright 104 may have a generally elongated narrow form that may extend perpendicular to a bumper 103 of a law enforcement vehicle. Preferably, the upright 104 may be formed of flat bar bent into a hollow shape. Each upright 104 may have a front surface 104a that locates outwardly of the vehicle 101 upon which may be a flexible pad 108 for scratch prevention upon other vehicles. An upright 104 may have a lower end 104d, generally locating below or to the bottom of a bumper 103, and an opposite upper end 104b, locating above a bumper 103 and generally in front of the hood. The upright 104 of the alternate embodiment may have a housing 109 attaching to the interior of the front surface 104a upon generally the entire length of the front surface 104a. The housing 109 may extend slightly wider than the width of the front surface 104a. Inside, the housing 109 may protect a forcing cone 112 and a horn 110 that collects sound from within the housing 109 and through the folded horn 111. The folded horn 111 may amplify the sound to the minimum decibels required for law enforcement as previously described. Also as before, the housing 109 may have a waterproof and insect proof cover 121 that transmits the sound of the siren.

From the aforementioned description, a bumper 3a with speaker 13 for a siren has been described. This speaker 13 may be uniquely capable of locating upon the uprights 4 of a push bumper 3a and projecting siren sound forward of the push bumper 3a in a horizontal plane to a vehicle ahead of a law enforcement vehicle 1. Though a law enforcement vehicle 1 has been described, the present invention may also be used by fire, security, and other first responder organizations. The bumper 3a with a speaker 13 for a siren and its various components may be manufactured from many materials, including but not limited to, polymers, polyvinyl chloride, polyethylene, polypropylene, ferrous and non-ferrous metals, their alloys, and composites, along with assembling the invention by welding, mechanical fasteners, or adhesives.

Figure 9:
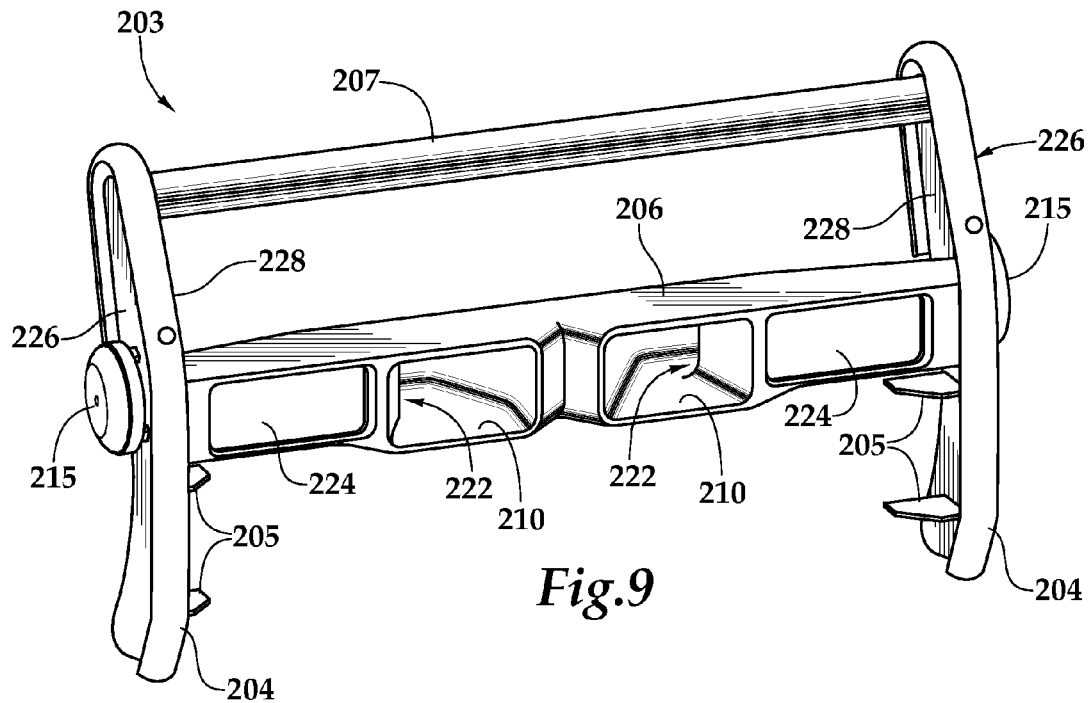
FIG. 9 is a perspective view of another embodiment of the present invention.
Figure 10:
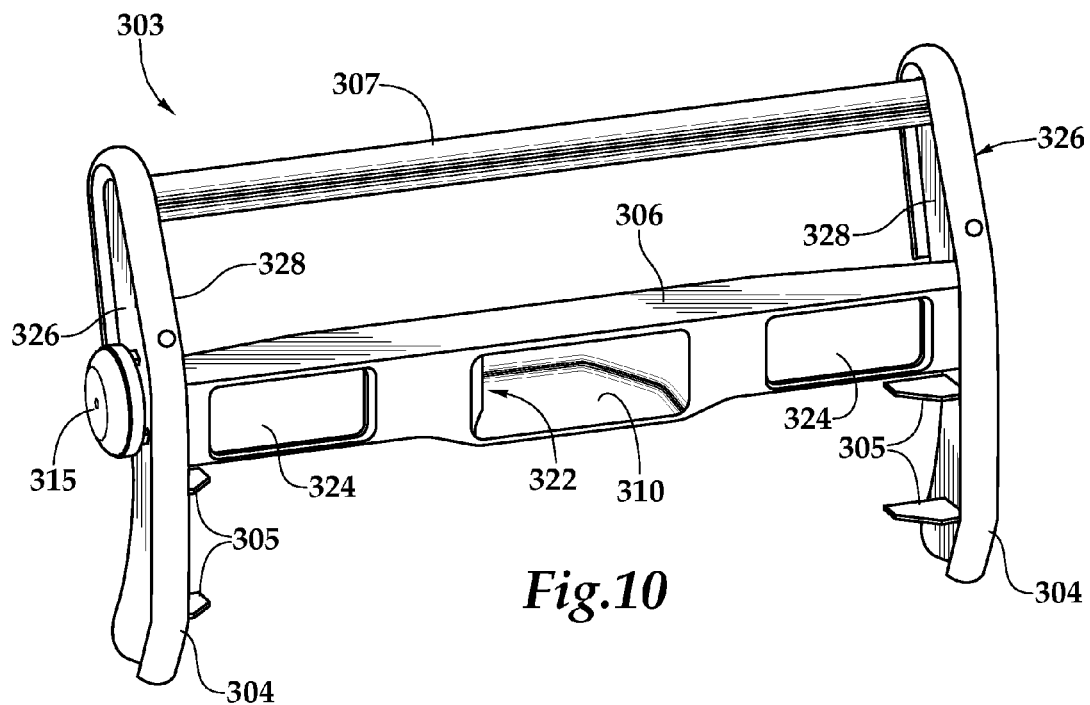
FIG. 10 is a perspective view of still another embodiment of the present invention.

Still further embodiments of the invention are seen in FIGS. 9 and 10. As with the previously described embodiments, bumper 203 may have uprights 204, a plurality of brackets 205 for mounting bumper 203 to vehicle 201, a lower member 206 and an upper member 207. Turning to FIG. 9, a bumper 203 is provided with horns 210 integral with lower member 206.

One or more of uprights 204 may have an outwardly facing side 226 and an inwardly facing side 228. In addition, one or more of uprights 204 may have an opening across a width of upright 204 from outwardly facing side 226 to inwardly facing side 228. End of driver 215 may be proximal outwardly facing side 226, and driver 215 may pass through upright and into lower member 206. A portion of driver 215 may be spaced slightly from outwardly facing side 226 so as to prevent interference in sound waves generated by driver 215, such as rattling of upright 204 or other distortion, caused by upright 204. For example, an insulator or vibration suppressor may be located between driver 215 and outwardly facing side 226. In addition, locating of a portion of driver 215 external to bumper 203 and/or spacing a portion of driver 215 from outwardly facing side 226 of upright 204 may increase air flow over and around driver 215 and diaphragm 214, thereby enhancing cooling of one or more of driver 215 and diaphragm 214. This cooling may lead to reduced heat of these elements, which may improve performance and extend the life of horn 210.

Staying with FIG. 9, in this embodiment, lower member 206 may have one or more sound chambers or channels 222 extending along at least a portion of a length of lower member 206. Lower member 206 may further have one or more lights 224 embedded in lower member 206, for example, proximate inwardly facing sides 228. Channels 222 may extend from drivers 215, behind lights 224 to form one or more horns 210. Channels 222 may also be small in cross-section proximate drivers 215 and expand in cross-sectional area towards openings of horns 210 on front surface 206a of lower member 206. Increase in cross-sectional area allows sound waves to expand, increasing the maximum amplitude of sound waves produced by driver 215, thereby increasing the volume of horn 210. As in FIG. 6B, this directional control of sound waves may further cause horn 210 to emit sound preferably focused in a generally horizontal plane, making horn 210 easier to hear by someone positioned forward of vehicle 201.

In addition, channels 222 and horns 210 may have generally rectangular cross-sections but may be configured in other shapes. Preferably, channels 222 have a cross-section similar to cross-section of lower member 206. In addition, channels 222 preferably have relatively thin walls, which may further increase the maximum possible size of channels 222, in turn increasing the maximum possible amplitude of horn 210.

Still staying with FIG. 9, horn or horns 210 may be integral with, or formed in, lower member of bumper 203. In addition, uprights 204 may be hollow, which may provide a void for locating wires for connection to a vehicle's electrical system in order to power drivers 215 and lights 224.

Turning to FIG. 10, an embodiment similar to FIG. 9 is shown. However, the embodiment of FIG. 10 provides for a single horn 310 substantially centered on lower member 306. Opening of horn 310 at front surface 306a of lower member may be approximately the same size as opening of either one of horns 210 shown in FIG. 9, but opening of horn 310 may also be larger or smaller. As a result of centering horn 310, sound chamber or channel 322 may be longer than channels 222, which may allow for even greater expansion of channel 322 and horn 310 and, therefore, a louder horn 310.

While the foregoing written description of the invention enables one of ordinary skill to make and use what is considered presently to be the best mode thereof, those of ordinary skill will understand and appreciate the existence of variations, combinations, and equivalents of the specific exemplary embodiments and methods herein. The invention should therefore not be limited by the above described embodiments and methods, but by all embodiments and methods within the scope and spirit of the invention as claimed.

What is claimed is:

1. A device for projecting a sound forward of a vehicle, comprising:
    a vehicle bumper configured to be attached to said vehicle, said bumper comprising a plurality of uprights and at least one generally horizontal member, said bumper further comprising:
    a horn for emitting said sound, said horn comprising a driver, a cone, a speaker and a diaphragm for producing said sound, at least a portion of said horn disposed within one of said plurality of uprights; and
    wiring to connect said device to an electrical system of said vehicle;
    wherein said horn is configured to focus said sound particularly forward of said vehicle.

2. A device for projecting sound forward of a vehicle according to claim 1, wherein said driver is attached to one of said plurality of uprights.

3. A device for projecting sound forward of a vehicle according to claim 2, further comprising a second driver attached to a second one of said plurality of uprights.

4. A device for projecting sound forward of a vehicle according to claim 2, wherein said horn is generally aligned with said one of said plurality of uprights.

5. A device for projecting sound forward of a vehicle according to claim 4, wherein said horn transmits said sound to a folded horn.

6. A device for projecting sound forward of a vehicle according to claim 2, further comprising a horn formed in said at least one generally horizontal member.

7. A device for projecting sound forward of a vehicle according to claim 6, further comprising:
   an indentation configured to receive a light, said indentation positioned between said horn formed in said at least one generally horizontal member and said one of said plurality of uprights.

8. A device for projecting sound forward of a vehicle according to claim 6, further comprising a channel in said generally horizontal member, wherein said channel extends generally along a portion of said generally horizontal member and then turns to form said horn.

9. A device for projecting sound forward of a vehicle according to claim 1, further comprising a cover for said speaker.

10. A device for projecting sound forward of a vehicle according to claim 9, wherein said cover is generally insect proof.

11. A device for projecting sound forward of a vehicle according to claim 9, wherein said cover is generally waterproof.

12. A device for projecting sound forward of a vehicle according to claim 9, wherein said cover is disposed within a profile of said upright.

13. A device for projecting sound forward of a vehicles according to claim 1, where said horn focuses said sound in a generally horizontal plane.

* * * * *